United States Patent [19]
Litzinger

[11] 3,867,780
[45] Feb. 25, 1975

[54] SLOW TROLL FISHING LURE
[76] Inventor: Charles H. Litzinger, 440 W. Caley Dr., Littleton, Colo. 80120
[22] Filed: Sept. 6, 1973
[21] Appl. No.: 394,921

[52] U.S. Cl. ............................................. 43/42.5
[51] Int. Cl. ......................................... A01k 85/00
[58] Field of Search............... 43/42.5, 42.51, 42.52, 43/42.19

[56] References Cited
UNITED STATES PATENTS
2,719,378  10/1955  Salm .................................. 43/42.5
2,733,534  2/1956  Mallory ............................... 43/42.5
2,755,591  7/1956  Beckesh ............................. 43/42.5
2,756,533  7/1956  Keith .................................. 43/42.5
2,822,637  2/1958  Keith .................................. 43/42.5
2,825,171  3/1958  Jacobson ........................... 43/42.5

Primary Examiner—Warner H. Camp
Attorney, Agent, or Firm—Richard D. Law

[57] ABSTRACT

A generally U-shaped member of strap material having unequal lengths of legs, has both legs curved conjointly in both longitudinally and laterally directions to provide a highly active fishing lure at very low speeds of travel through the water.

2 Claims, 9 Drawing Figures

PATENTED FEB 25 1975 3,867,780
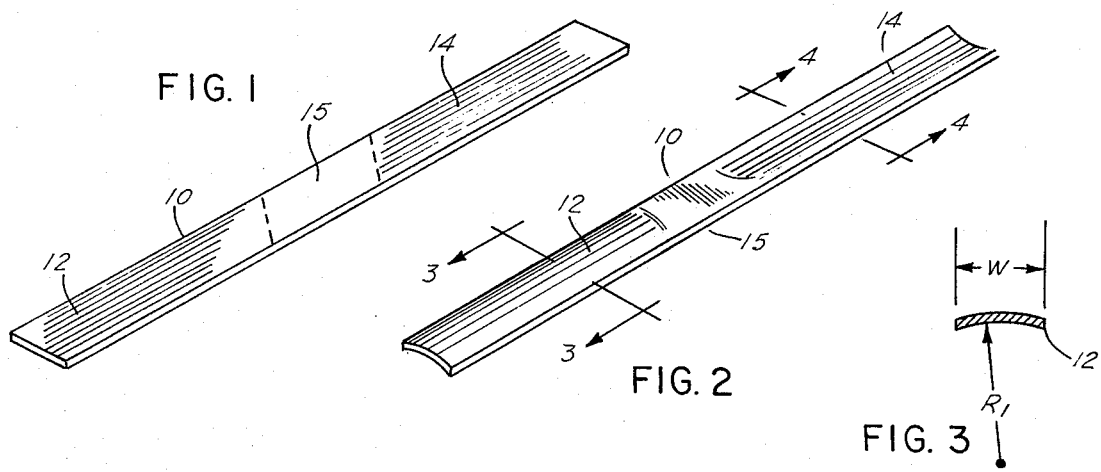
FIG. 1
FIG. 2
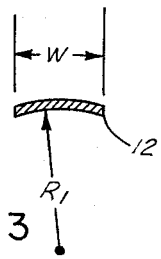
FIG. 3
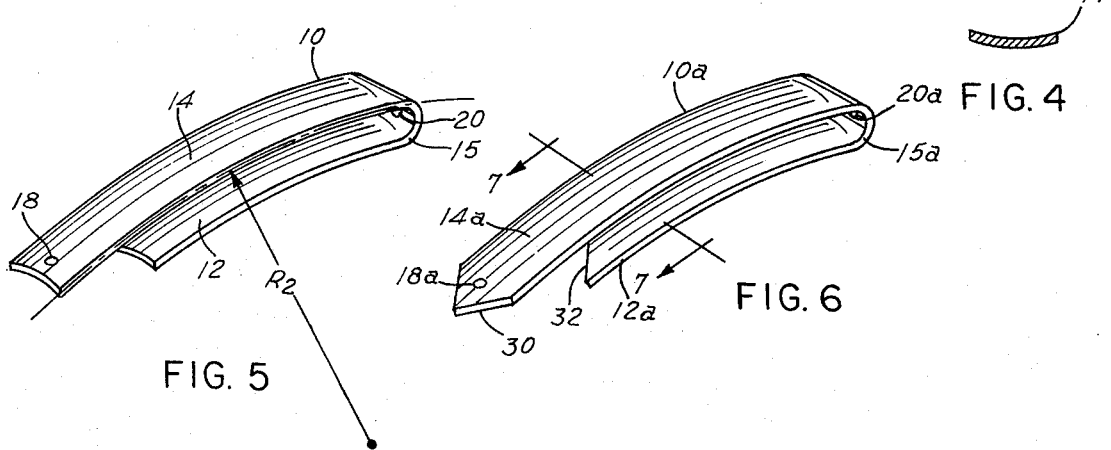
FIG. 5
FIG. 4
FIG. 6
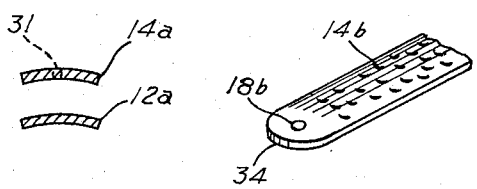
FIG. 7 FIG. 8
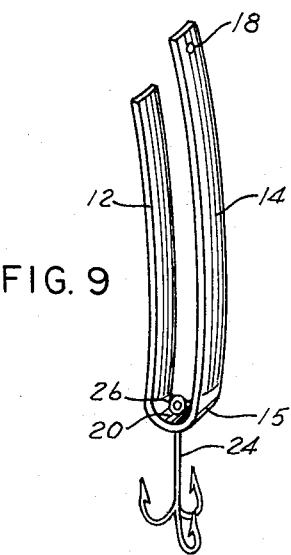
FIG. 9

SLOW TROLL FISHING LURE

This invention relates to U-shaped fish lures and provides a substantial improvement over the fishing lure described in U.S. Pat. No. 2,719,378, now expired. A fishing lure manufactured in accordance with the specification of U.S. Pat. No. 2,719,378, generally comprises a piece of strap material bent back on itself to provide a generally U-shaped member with unequal length legs or blades of U. The strap material is laterally flat, but the two legs are conjointly curved in a longitudinal direction so as to hold the legs approximately the same distance apart. The fishing line is attached to the longer leg and the hook is attached to the the bight between the legs. The ends of both legs are cut at a bias, diagonally to each other, and both are cut at from 60°-80° from the longitudinal axis of the body.

Such a lure has been sold for a number of years under the name "Super Duper" by South Bend Bait Company of South Bend, Ind. It has been found to be quite successful under many fishing conditions, however, it must be retrieved rather rapidly to obtain the action for which it was intended. According to the present invention, it has been found that by forming a generally U-shaped lure which is arcuate in both longitudinal and lateral directions, the lure has considerable advantages over the "Super Duper" type lure, in that it has a very high degree of action at a slow and very slow movement through the water. Thus, the lure is a very slow trolling lure or a very slow retrieving lure as opposed to the faster troll requirements of the other type of lure.

It is, therefore, included among the objects and advantages of the present invention to provide a slow moving, high action fishing lure.

Another object of the invention is to provide a lure formed of a single strap of material bent back along itself and arcuately formed in longitudinal and lateral directions.

It is a further object of the invention to provide a fishing lure formed of generally U-shape strap material, having one leg slightly longer than the other and which legs are arcuately formed along both lateral and longitudinal lines.

These and other objects and advantages of the invention may be readily ascertained by referring to the following description and appended illustration in which:

FIG. 1 is a perspective view of a blank of a strap of material from which a fish lure according to the invention is made;

FIG. 2 is a perspective view of the strap material of FIG. 1 formed into laterally arced portions which will be upper and lower legs of a finished lure;

FIG. 3 is a cross sectional view of the device of FIG. 2 taken along section lines 3-3;

FIG. 4 is a cross sectional view of the device of FIG. 2 taken along section lines 4-4;

FIG. 5 is a perspective view of one form of a lure formed from the blank shown in FIG. 2;

FIG. 6 is a perspective view of a modified form of lure according to the invention illustrating different ends cuts on the legs of the U-shaped member;

FIG. 7 is a cross sectional view of the device of FIG. 6 taken along section line 7-7;

FIG. 8 is a detailed, perspective view of an end of one leg of a modified lure according to the invention; and FIG. 9 is a perspective view of a finished lure according to the invention with a mounted hook ready for fishing.

The device of FIG. 1 illustrates a blank for a fishing lure, which includes a body 10 of strap material, which may be metal, plastic or the like, but preferably of copper, brass, chrome-plated copper or brass, or the like, and may be of various lengths and widths, depending on the type of lure to be made from the blank. The lure blank is divided into three general sections, including an end section or portion 12 at one end, an end portion 14 at the opposite end and an area 15 between the two end sections. The end section 12 is shorter than end section 14 as explained below. As illustrated in FIG. 2, the next step in the formation of the lure is shown, where the end 14 is arced in an upwardly manner and the end 12 is arced in a downwardly direct manner leaving the area 15 as a flat portion. The dimensioning of arcuate portion 12 is illustrated in FIG. 3 wherein its radius of curvature R, divided by its width W ($R_1/W$) is a ratio in the range of 0.6-1.0, and preferably in the 0.75 to 0.835 range. FIG. 4 illustrates the opposite end of the blank with the same ratio as the other end. This provides a pair of legs at the same distance apart across their width, as explained for FIG. 7. The lure is formed by folding the end portion 14 back over the end portion 12, so that the end portion 14 which is slightly longer than the end portion 12 extends beyond the end of leg portion 12, to form a generally U-shaped configuration, as shown in FIG. 5. The legs 12 and 14 are arcuately formed along a radius of curvature $R_2$ to provide a curved lure so that the legs are approximately parallel along the radius of curvature, however, the legs are, also, arcuate in a lateral direction, as explained for FIG. 7. The width of the legs extend parallel across their extent. The ratio of the radius of curvature $R_2$ to the lateral radius of curvature $R_1$ is in the range of $R_2/R_1 = 10-15$, and preferably 11-13.

In one lure useful for spin fishing, the blank is formed of sheet metal approximately 0.032 inches thick, 0.312 inches wide, and 3 11/16 inches long. When bent back on itself, this will form a lure approximately two inches long. The lateral radius of curvature $R_1$ of a lure of this size is approximately three-eighths of an inch and the ratio of the radius of curvature $R_1$ to the width W ($R_1/W$) is 0.835. The ratio of the radius of curvature $R_2$ to the radius of curvature $R_1$ ($R_2/R_1$) in a lure of this size is 12.0.

The lure is completed by forming a line supporting aperture 18 in the end portion 14 and a hook holding aperture 20 at about the middle of the bight 15 between the two legs 12 and 14. The lure may be left smooth and shiny, may be hammered, as shown in FIG. 8, to give a mottled effect, or it may be painted or decorated to give any desired decorative appearance.

The lure is used by connecting a fishing line to the aperture 18, FIG. 9, and a treble hook 24 (a double hook or a single hook or the like may also be used) attached to the opening 20. One simple connection is to pass the shank of a treble hook assembly 24 through the aperture 20, and a loop 26 in the end of the shank on the inside of the U-shape lure holds the hook assembly to the lure. When connected to a line and slowly moved through the water, the lure has a high action side to side movement, including jerking or fluttering, similar to a wounded minnow. This action is very enticing to fish, including trout, bass or the like.

A lure formed with a body 10a, FIG. 6, similar to the body 10 of FIGS. 1 through 5, is provided with a double arcuate leg or blade portion 12a and a similar double arcuate portion 14a connected by a flat section 15a. End 30 of the leg section 14a is provided with a line holding aperture 18a, while the end 32 is cut at a bias to the longitudinal axis of the leg 12a.

As illustrated in FIG. 7, a cross-sectional view through the finished lure, provides an arcuate upper and lower leg portion along the cut 7–7 which are approximately parallel laterally, and has been pointed out before, the legs are, also, approximately parallel longitudinally. This same configuration is followed in the finished lure embodiments of FIGS. 5 and 9.

In the detail shown in FIG. 8, an end portion 14b of a lure, similar to the end portion of leg 14 of the device of FIG. 5, is provided with a rounded end 34 having a line holding aperture 18b therein. This indicates that the configuration of the cut of the ends of the legs does not substantially change the action of the lure. The lateral arcuate configuration gives the lure a high degree of action at a very low movement through the water, and, in fact, the lure does not perform effectively at higher velocities through the water.

It has been found in actual tests that a fisherman using the "Super Duper" received no strikes and did not catch any fish whatever, while a fisherman using a lure according to the invention from the same boat at the same time received a strike on almost every cast and was able to catch a substantial number of fish. It was, also, demonstrated that by trolling with a device of the invention at a normal trolling speed, no fish were caught; however, when the trolling speed was reduced to a slow rowing speed, a considerable number of fish hit the lure and a number were caught, demonstrating that the lure is a slow velocity lure.

The lure may be made in various sizes from small fly line lures, to large salt water lures for slow trolling. The lures are readily painted or variously colored as may be desired. The action of the lure is maintained within the ratios explained above.

I claim:

1. In a fishing lure for slow travel through water having a general U-shape with one leg thereof longer than the other and both legs being arcuate along a radius of curvature in a longitudinal direction, line attaching means to the longer leg thereof and hook attaching means to the bight between said legs, the improvement in which said legs are laterally arcuate along their length, each said leg having approximately the same lateral radius of curvature to provide an approximately parallel lateral extent of said legs and wherein said lateral radius of curvature of said legs to the width of said legs is in a ratio of from 0.6–1.0 providing a high side to side action of said lure at slow travel.

2. In the improvement of claim 1, wherein said ratio is 0.75 to 0.835.

* * * * *